(12) United States Patent  (10) Patent No.: US 11,750,936 B2
Yasui  (45) Date of Patent: Sep. 5, 2023

(54) CONTROL DEVICE, OPERATION METHOD FOR CONTROL DEVICE, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/700,701

(22) Filed: Mar. 22, 2022

(65) Prior Publication Data

US 2022/0311936 A1  Sep. 29, 2022

(30) Foreign Application Priority Data

Mar. 25, 2021 (JP) ................. 2021-052007

(51) Int. Cl.
*H04N 23/80* (2023.01)
*H04N 23/90* (2023.01)
*B60R 11/04* (2006.01)
*G06T 3/00* (2006.01)

(52) U.S. Cl.
CPC ............. *H04N 23/80* (2023.01); *B60R 11/04* (2013.01); *G06T 3/00* (2013.01); *H04N 23/90* (2023.01)

(58) Field of Classification Search
CPC ...... H04N 23/80; H04N 23/90; H04N 23/698; B60R 11/04; B60R 2300/306; B60R 2300/70; B60R 1/28; B60R 1/00; B60R 2300/105; B60R 2300/30; G06T 3/00; G06T 3/0062; B60W 30/08; B60W 60/001; B60W 2420/42; B60W 2420/52
See application file for complete search history.

(56) References Cited

U.S. PATENT DOCUMENTS

| 2012/0093365 | A1* | 4/2012 | Aragane | .................. H04N 7/15 348/E7.078 |
| 2018/0302544 | A1* | 10/2018 | Dhiman | ................. H04N 25/61 |
| 2018/0365859 | A1 | 12/2018 | Oba et al. | |
| 2019/0096090 | A1* | 3/2019 | Hirai | .................... H04N 23/698 |
| 2022/0311921 | A1* | 9/2022 | Kanehara | ................. H04N 7/18 |

FOREIGN PATENT DOCUMENTS

JP  2008-48443 A  2/2008

OTHER PUBLICATIONS

Related co-pending U.S. Appl. No. 17/700,693.
Office Action dated Jul. 25, 2023, issued in related co-pending U.S. Appl. No. 17/700,693. (23 pages).

* cited by examiner

*Primary Examiner* — Hung H Lam
(74) *Attorney, Agent, or Firm* — WHDA, LLP

(57) ABSTRACT

A control device that controls imaging with fisheye cameras disposed on front and rear portions and right and left side portions of a vehicle, the control device comprising: an acquisition unit configured to acquire information regarding a speed of the vehicle; and a control unit configured to control a conversion center position for converting a fisheye image of each of the fisheye cameras into a planar image based on the speed of the vehicle.

9 Claims, 5 Drawing Sheets

FIG. 2A
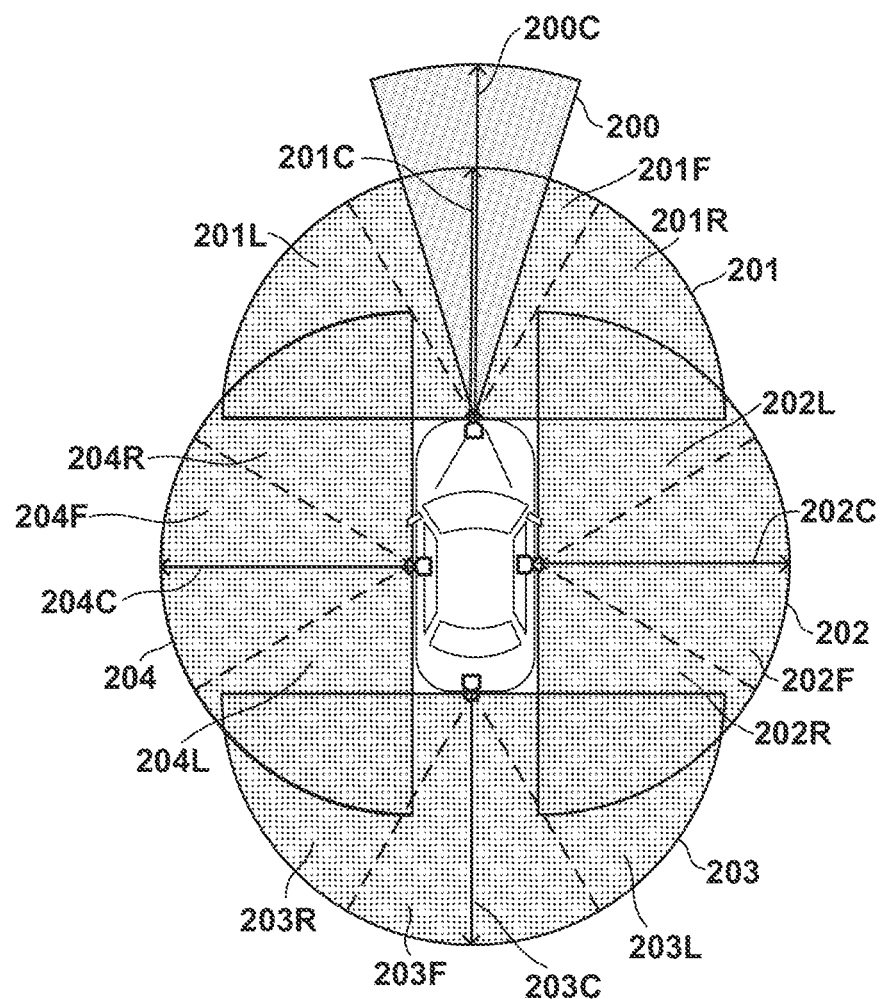
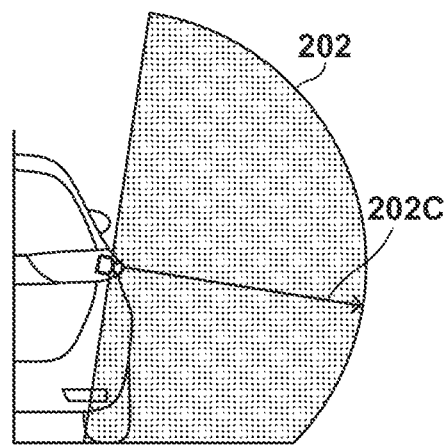
FIG. 2B
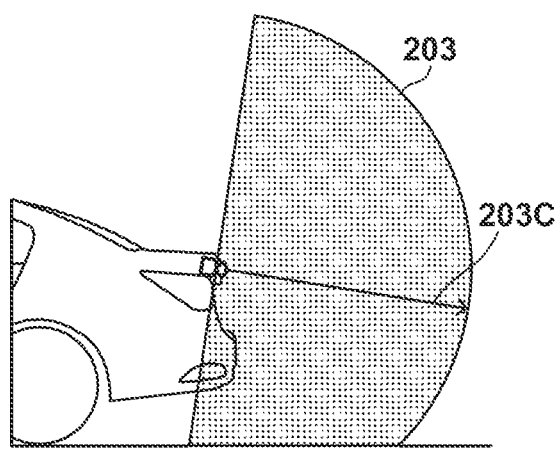
FIG. 2C

CONTROL DEVICE, OPERATION METHOD FOR CONTROL DEVICE, AND STORAGE MEDIUM

CROSS-REFERENCE TO RELATED APPLICATION(S)

This application claims priority to and the benefit of Japanese Patent Application No. 2021-052007 filed on Mar. 25, 2021, the entire disclosure of which is incorporated herein by reference.

BACKGROUND OF THE INVENTION

Field of the Invention

The present invention relates to a control device, an operation method for the control device, and a storage medium.

Description of the Related Art

An object is detected from an image obtained by imaging a periphery of a vehicle and used for control such as driving assistance. At that time, it is also assumed that a fisheye camera having a wide angle of view is used to widen a detection range. However, since the image acquired by the fisheye camera is distorted, detection accuracy may decrease when an object detection technique based on an image without distortion obtained from a normal camera is applied.

Japanese Patent Laid-Open No. 2008-48443 discloses a technique of performing distortion correction processing on a distorted image and performing object detection by using the corrected image.

However, in the technique described in Japanese Patent Laid-Open No. 2008-48443, it is not considered which area is used for cutting out from the fisheye image and performing correction conversion into the planar image according to a situation such as a speed of the vehicle. Therefore, there is a problem that it is difficult to accurately acquire appropriate peripheral information according to the vehicle speed.

The present invention has been made in view of the above problem, and provides a technique for acquiring appropriate peripheral information according to the vehicle speed.

SUMMARY OF THE INVENTION

According to one aspect of the present invention, there is provided a control device that controls imaging with fisheye cameras disposed on front and rear portions and right and left side portions of a vehicle, the control device comprising: an acquisition unit configured to acquire information regarding a speed of the vehicle; and a control unit configured to control a conversion center position for converting a fisheye image of each of the fisheye cameras into a planar image based on the speed of the vehicle.

BRIEF DESCRIPTION OF THE DRAWINGS

FIG. 2A is a view illustrating an imaging range of each fisheye camera in a horizontal direction;

FIG. 2B is a view illustrating an imaging range of each fisheye camera on a right-side portion in a vertical direction;

FIG. 2C is a view illustrating an imaging range of each fisheye camera on a rear portion in a vertical direction;

DESCRIPTION OF THE EMBODIMENTS

Figure 1:
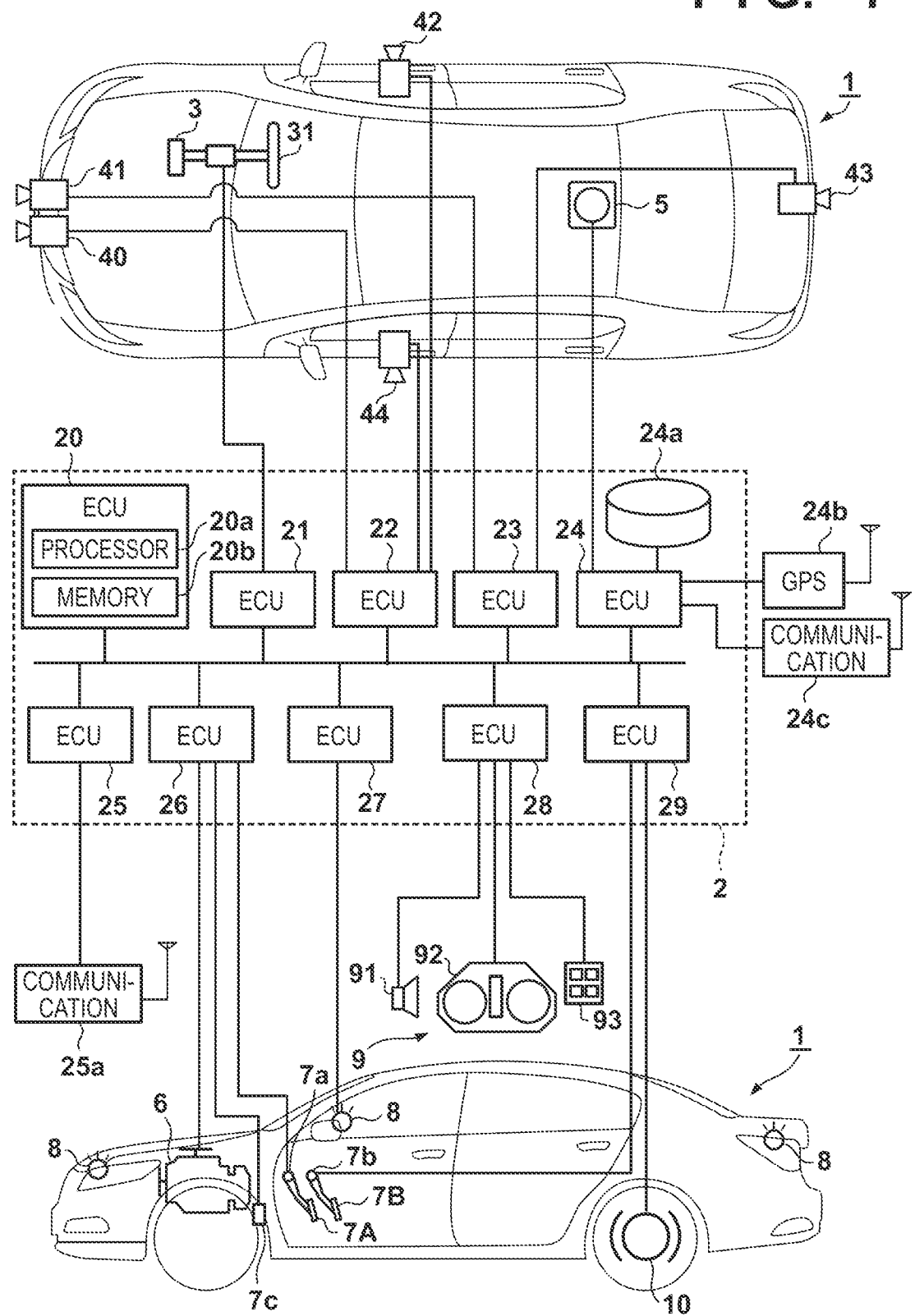
FIG. 1 is a block diagram of a vehicle according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Embodiment

<Configuration>

FIG. 1 is a block diagram of a vehicle 1 according to an embodiment of the present invention. In FIG. 1, the vehicle 1 is schematically illustrated in a plan view and a side view. The vehicle 1 is, for example, a sedan type of four-wheeled passenger vehicle. The vehicle 1 may be such a four-wheeled vehicle, a two-wheeled vehicle, or another type of vehicle.

The vehicle 1 includes a vehicle control device 2 (hereinafter, simply referred to as a control device 2) that controls the vehicle 1. The control device 2 includes a plurality of electronic control units (ECUs) 20 to 29 communicably connected by an in-vehicle network. Each of the ECUs includes a processor such as a central processing unit (CPU), a memory such as a semiconductor memory, and an interface with an external device. The memory stores a program executed by the processor, data used by the processor for processing, and the like. Each of the ECUs may include a plurality of processors, memories, and interfaces. For example, the ECU 20 includes one or more processors 20a and one or more memories 20b. Each of the processors 20a executes an instruction including the program stored in each of the memories 20b, so that processing is executed by the ECU 20. Alternatively, the ECU 20 may include a dedicated integrated circuit such as an application specific integrated circuit (ASIC) for executing the processing by the ECU 20. The same applies to the other ECUs.

Hereinafter, functions and the like assigned to each of the ECUs 20 to 29 will be described. Note that the number of ECUs and functions to be handled can be designed as appropriate and can be subdivided or integrated as compared with the present embodiment.

The ECU 20 executes control related to automated traveling of the vehicle 1. In automated driving, at least any one of steering and acceleration/deceleration of the vehicle 1 is automatically controlled. The automated traveling by the ECU 20 may include automated traveling that does not require a traveling operation by a driver (which may also be referred to as automated driving) and automated traveling for assisting the traveling operation by the driver (which may also be referred to as driving assistance).

The ECU 21 controls an electric power steering device 3. The electric power steering device 3 includes a mechanism that steers front wheels according to a driving operation (steering operation) of a driver with respect to a steering wheel 31. Furthermore, the electric power steering device 3 includes a motor that produces driving force for assisting the steering operation and automatically steering the front wheels, and a sensor that detects a steering angle. In a case where a driving state of the vehicle 1 is automated driving, the ECU 21 automatically controls the electric power steering device 3 in response to an instruction from the ECU 20 and controls a traveling direction of the vehicle 1.

The ECUs 22 and 23 control detection units for detecting a peripheral situation of the vehicle and performs information processing on detection results. The vehicle 1 includes one standard camera 40 and four fisheye cameras 41 to 44 as detection units for detecting the peripheral situation of the vehicle. The standard camera 40 and the fisheye cameras 42 and 44 are connected to the ECU 22. The fisheye cameras 41 and 43 are connected to the ECU 23. The ECUs 22 and 23 can extract an outline of a target object or a lane division line (white line or the like) on a road by analyzing images captured by the standard camera 40 and the fisheye cameras 41 to 44.

The fisheye cameras 41 to 44 are cameras provided with a fisheye lens. Hereinafter, a configuration of the fisheye camera 41 will be described. The other fisheye cameras 42 to 44 may have a similar configuration. The angle of view of the fisheye camera 41 is wider than the angle of view of the standard camera 40. Therefore, the fisheye camera 41 can image a wider area than the area of the standard camera 40. The image captured by the fisheye camera 41 has a larger distortion than the image captured by the standard camera 40. Therefore, before analyzing the image captured by the fisheye camera 41, the ECU 23 may perform conversion processing (hereinafter, referred to as "distortion correction processing") for reducing distortion on the image. On the other hand, before analyzing the image captured by the standard camera 40, the ECU 22 may not perform the distortion correction processing on the image. In this manner, the standard camera 40 is an imaging device that captures an image not to be subjected to the distortion correction processing, and the fisheye camera 41 is an imaging device that captures an image to be subjected to the distortion correction processing. Instead of the standard camera 40, any of other imaging devices may be used, which captures an image not to be subjected to the distortion correction processing, for example, a camera attached with a wide-angle lens or a telephoto lens may be used.

The standard camera 40 is attached at a center of a front portion of the vehicle 1 and captures an image of the peripheral situation in front of the vehicle 1. The fisheye camera 41 is attached at the center of the front portion of the vehicle 1 and captures an image of the peripheral situation in front of the vehicle 1. In FIG. 1, the standard camera 40 and the fisheye camera 41 are illustrated as being aligned horizontally. However, the arrangement of the standard camera 40 and the fisheye camera 41 is not limited to this, and for example, the standard camera 40 and the fisheye camera 41 may be aligned vertically. Furthermore, at least one of the standard camera 40 or the fisheye camera 41 may be attached to a front portion of a roof (for example, on a vehicle interior side of a windshield) of the vehicle 1. The fisheye camera 42 is attached at a center of a right-side portion of the vehicle 1 and captures an image of the peripheral situation on the right side of the vehicle 1. The fisheye camera 43 is attached at a center of a rear portion of the vehicle 1 and captures an image of the peripheral situation behind the vehicle 1. The fisheye camera 44 is attached at a center of a left-side portion of the vehicle 1 and captures an image of the peripheral situation on the left side of the vehicle 1.

The types, number, and attachment positions of the cameras provided to the vehicle 1 are not limited to the example described above. Furthermore, the vehicle 1 may include Light Detection and Ranging (LiDAR) or a millimeter-wave radar as a detection unit for detecting the target object around the vehicle 1 and measuring a distance to the target object.

The ECU 22 controls the standard camera 40, and the fisheye cameras 42 and 44, and performs information processing on detection results. The ECU 23 controls the fisheye cameras 41 and 43 and performs information processing on detection results. Reliability of the detection results can be improved by dividing the detection units for detecting the peripheral situation of the vehicle into two systems.

The ECU 24 controls a gyro sensor 5, a GPS sensor 24b, and a communication device 24c, and performs information processing on a detection result or a communication result. The gyro sensor 5 detects a rotational motion of the vehicle 1. A course of the vehicle 1 can be determined based on the detection result of the gyro sensor 5, a wheel speed, and the like. The GPS sensor 24b detects a current location of the vehicle 1. The communication device 24c performs wireless communication with a server that provides map information and traffic information and acquires these pieces of information. The ECU 24 can access a map information database 24a constructed in the memory, and the ECU 24 searches for a route from the current position to a destination. The ECU 24, the map information database 24a, and the GPS sensor 24b constitute a so-called navigation device.

The ECU 25 includes a communication device 25a for vehicle-to-vehicle communication. The communication device 25a performs wireless communication with other surrounding vehicles to exchange information between the vehicles.

The ECU 26 controls a power plant 6. The power plant 6 is a mechanism that outputs a driving force for rotating driving wheels of the vehicle 1 and includes, for example, an engine and a transmission. For example, the ECU 26 controls an output of the engine according to a driving operation (accelerator operation or acceleration operation) of the driver detected by an operation detection sensor 7a provided on an accelerator pedal 7A and switches a gear ratio of the transmission based on information such as a vehicle speed detected by a vehicle speed sensor 7c. In a case where the driving state of the vehicle 1 is automated driving, the ECU 26 automatically controls the power plant 6 in response to the instruction from the ECU 20, and controls the acceleration/deceleration of the vehicle 1.

The ECU 27 controls a lighting device (headlight, taillight, and the like) including a direction indicator 8 (blinker). In the example of FIG. 1, the direction indicators 8 are provided at the front portion, door mirrors, and the rear portion of the vehicle 1.

The ECU 28 controls an input and output device 9. The input and output device 9 outputs information to the driver and receives an input of information from the driver. A voice output device 91 notifies the driver of information by voice. A display device 92 notifies the driver of information by displaying an image. The display device 92 is disposed, for example, in front of a driver's seat, and constitutes an instrument panel. Note that, although the voice and the image display have been exemplified here, information notification may also be made by using vibration or light. Furthermore, information notification may be made by using a combination of some of voice, display, vibration, and light. Furthermore, the combination or the notification form may be changed in accordance with a level (for example, a degree of urgency) of information notification of which should be made. An input device 93 is a switch group that is disposed at a position where the driver can operate the input device and is used to input an instruction to the vehicle 1. The input device 93 may also include a voice input device.

The ECU 29 controls a brake device 10 and a parking brake (not illustrated). The brake device 10 is, for example, a disc brake device, is provided on each wheel of the vehicle 1, and applies resistance to the rotation of the wheel to decelerate or stop the vehicle 1. The ECU 29 controls, for example, working of the brake device 10 in response to the driver's driving operation (brake operation) that has been detected by an operation detection sensor 7b provided on a brake pedal 7B. In a case where the driving state of the vehicle 1 is automated driving, the ECU 29 automatically controls the brake device 10 in response to the instruction from the ECU 20, and controls the deceleration and stop of the vehicle 1. The brake device 10 and the parking brake also can work to maintain a stopped state of the vehicle 1. Furthermore, in a case where the transmission of the power plant 6 is provided with a parking lock mechanism, the parking lock mechanism also can work to maintain the stopped state of the vehicle 1.

<Imaging Range>

Next, imaging ranges of the standard camera 40 and the fisheye cameras 41 to 44 will be described with reference to FIGS. 2A to 2C. FIG. 2A illustrates a horizontal imaging range of each camera, FIG. 2B illustrates a vertical imaging range of the fisheye camera 42 attached to the right-side portion of the vehicle 1, and FIG. 2C illustrates a vertical imaging range of the fisheye camera 43 attached to the rear portion of the vehicle 1.

First, the imaging range of the vehicle 1 in plan view (for example, in the horizontal direction of the vehicle 1) will be described with reference to FIG. 2A. The standard camera 40 images scenery included in an imaging range 200. An imaging center 200C of the standard camera 40 faces a directly forward side of the vehicle 1. The horizontal angle of view of the standard camera 40 may be less than 90°, for example, may be about 45° or about 30°.

The fisheye camera 41 images scenery included in an imaging range 201. An imaging center 201C of the fisheye camera 41 faces the directly forward side of the vehicle 1. The fisheye camera 42 images scenery included in an imaging range 202. An imaging center 202C of the fisheye camera 42 faces a directly right side of the vehicle 1. The fisheye camera 43 images scenery included in an imaging range 203. An imaging center 203C of the fisheye camera 43 faces a directly rear side of the vehicle 1. The fisheye camera 44 images scenery included in an imaging range 204. An imaging center 204C of the fisheye camera 44 faces a directly left side of the vehicle 1. The horizontal angles of view of the fisheye cameras 41 to 44 may be, for example greater than 90°, greater than 150°, or greater than 180°, and for example may be about 180°. FIG. 2A illustrates an example in which the horizontal angles of view of the fisheye cameras 41 to 44 is 180°.

The imaging range 201 can be divided into an area 201L on a diagonally forward left side of the vehicle 1, an area 201F on a directly forward side of the vehicle 1, and an area 201R on a diagonally forward right side of the vehicle 1. The imaging range 202 can be divided into an area 202L on a diagonally forward right side of the vehicle 1, an area 202F on a directly right side of the vehicle 1, and an area 202R on a diagonally rearward right side of the vehicle 1. The imaging range 203 can be divided into an area 203L on a diagonally rearward right side of the vehicle 1, an area 203F on a directly rear side of the vehicle 1, and an area 203R on a diagonally rearward left side of the vehicle 1. The imaging range 204 can be divided into an area 204L on a diagonally rearward left side of the vehicle 1, an area 204F on a directly left side of the vehicle 1, and an area 204R on a diagonally forward left side of the vehicle 1. The imaging range 201 may be equally divided into the three areas 201L, 201F, and 201R (that is, the angles of views of the respective areas are made equal to one another). The other imaging ranges 202 to 204 may also be each divided equally into three areas.

The standard camera 40 and the fisheye cameras 41 to 44 have the imaging ranges 200 to 204 as described above, so that the directly forward direction and the four oblique directions of the vehicle 1 are included in the imaging ranges of the two individual cameras. Specifically, the directly forward side of the vehicle 1 is included in both the imaging range 200 of the standard camera 40 and the area 201F of the imaging range 201 of the fisheye camera 41. The diagonally forward right side of the vehicle 1 is included in both the area 201R of the imaging range 201 of the fisheye camera 41 and the area 202L of the imaging range 202 of the fisheye camera 42. The same applies to the other three oblique directions of the vehicle 1.

Next, a vertical imaging range of the vehicle 1 will be described with reference to FIGS. 2B and 2C. In FIG. 2B, the vertical imaging range of the fisheye camera 42 will be described, and in FIG. 2C, the vertical imaging range of the fisheye camera 43 will be described. The same may apply to the vertical imaging ranges of the other fisheye cameras 41 and 44.

The vertical angles of view of the fisheye cameras 41 to 44 may be, for example, greater than 90°, greater than 150°, or greater than 180°, and for example, may be about 180°. FIGS. 2B and 2C illustrate an example in which the vertical angle of view of the fisheye cameras 41 to 44 is 180°. In the illustrated example, the imaging center 203C of the fisheye camera 43 faces a lower side than a direction parallel to the ground (toward the ground side). Instead of this, the imaging center 203C of the fisheye camera 43 may face a direction parallel to the ground, or may face an upper side than the direction parallel to the ground (an opposite side of the ground). Furthermore, the imaging centers 201C to 204C of the fisheye cameras 41 to 44 may face different directions from one another in the vertical direction.

Figure 3:
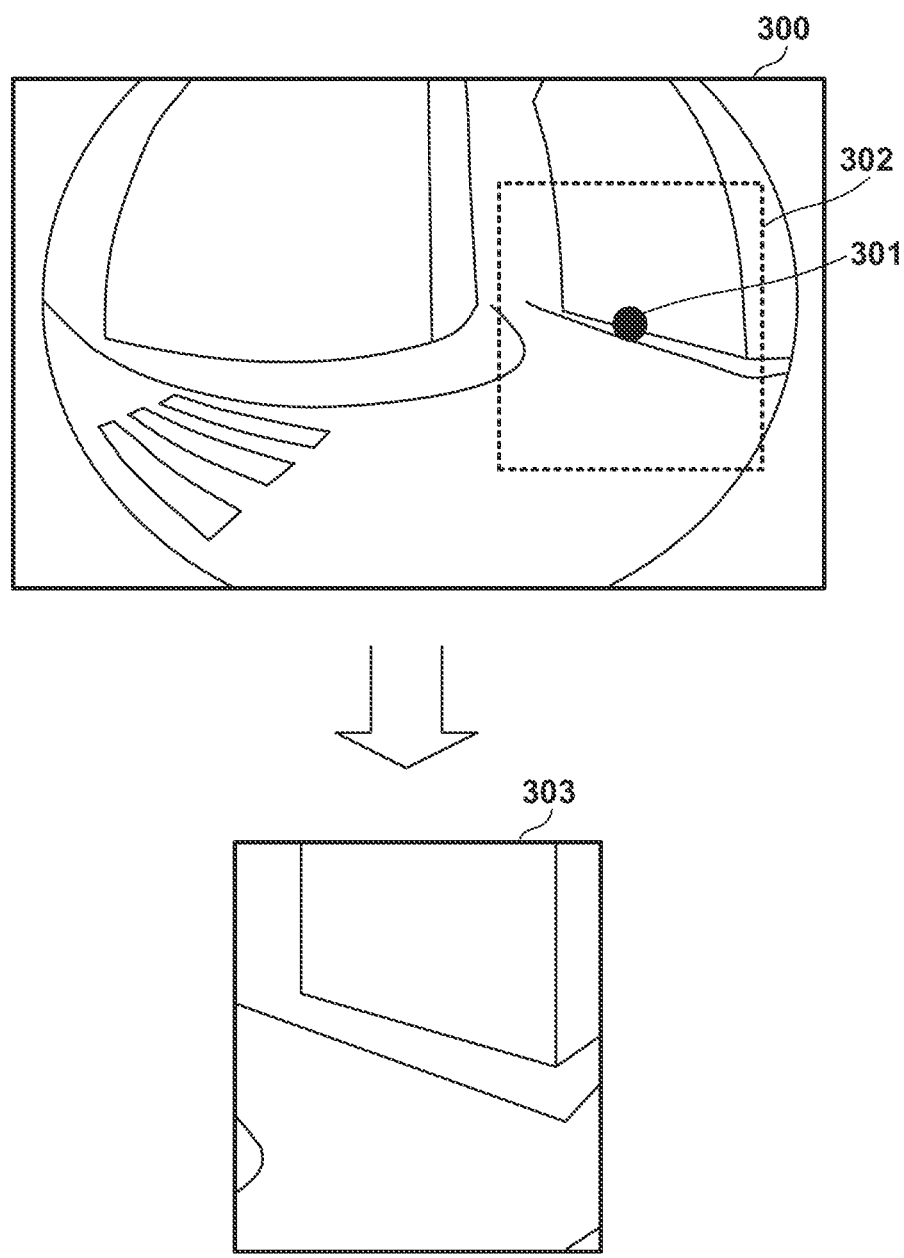
FIG. 3 is an explanatory diagram of distortion correction processing of a fisheye image.

The distortion correction processing of the images captured by the fisheye cameras 41 to 44 will be described with reference to FIG. 3. An image 300 is an image of scenery on the rightward side of the vehicle 1 captured by the fisheye camera 42. As illustrated, the image 300 has a significant distortion particularly in a peripheral portion.

The ECU 22 connected to the fisheye camera 42 performs distortion correction processing on the image 300 (processing of converting the fisheye image into a planar image).

Specifically, the ECU 22 sets one point in the image 300 as a correction center point 301. The ECU 22 cuts out a rectangular area 302 centered on the correction center point 301 from the image 300. The ECU 22 generates an image 303 in which the distortion is reduced by performing the distortion correction processing on the area 302. In the distortion correction processing, the closer a position is to the correction center point 301, the more the distortion is reduced, and at a position far from the correction center point 301, the distortion is not reduced or the distortion is increased. Therefore, in some embodiments, the ECU 22 sets the correction center point 301 in an area desired to focus on in the surrounding environment of the vehicle 1, and generates an image in which the distortion is reduced for such an area.

<Processing>

Figure 4:
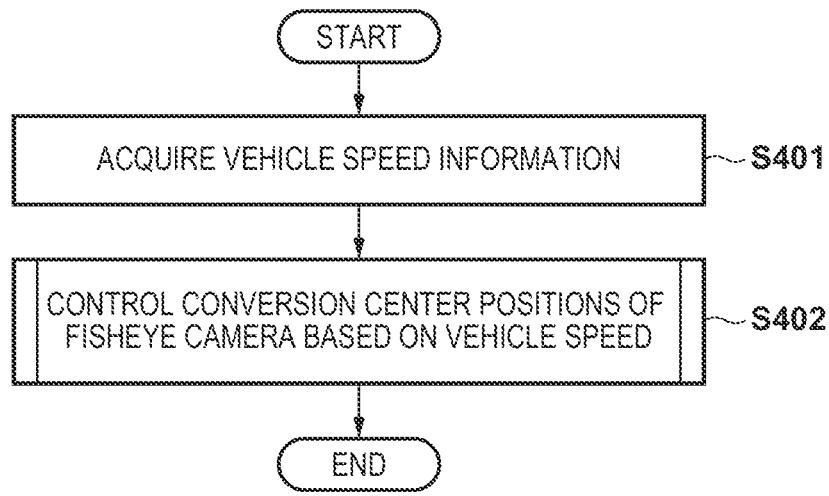
FIG. 4 is a flowchart illustrating a procedure of processing performed by a control device according to an embodiment of the present invention.

Next, a procedure of processing performed by the control device 2 according to the present embodiment will be described with reference to a flowchart of FIG. 4.

In S401, the ECU 22 and the ECU 23 acquire speed information of the vehicle 1 detected by the vehicle speed sensor 7c. The speed acquired here is a current traveling speed of the vehicle 1.

In S402, the ECU 22 and the ECU 23 respectively control the conversion center positions for converting the fisheye image captured by each fisheye camera (fisheye cameras 41 to 44) into the planar image based on the speed information of the vehicle 1 acquired in S401. The ECU 22 sets each of conversion center positions for converting a rightward fisheye image captured by the fisheye camera 42 that captures the rightward image (image in a right direction) of the vehicle 1 and a leftward fisheye image captured by the fisheye camera 44 that captures the leftward image (image in a left direction) of the vehicle 1 into a planar image. Furthermore, the ECU 23 sets each of conversion center positions for converting a forward fisheye image captured by the fisheye camera 41 that captures the forward image of the vehicle 1 and a rearward fisheye image captured by the fisheye camera 43 that captures the rearward image of the vehicle 1 to a planar image. A detailed example of the processing of this step will be described later with reference to FIG. 5. Note that image conversion is executed based on the conversion center position set in this step, and various operations such as acquisition of the peripheral information and driving assistance are executed by using the converted image. Accordingly, the series of processing in FIG. 4 is ended.

Figure 5:
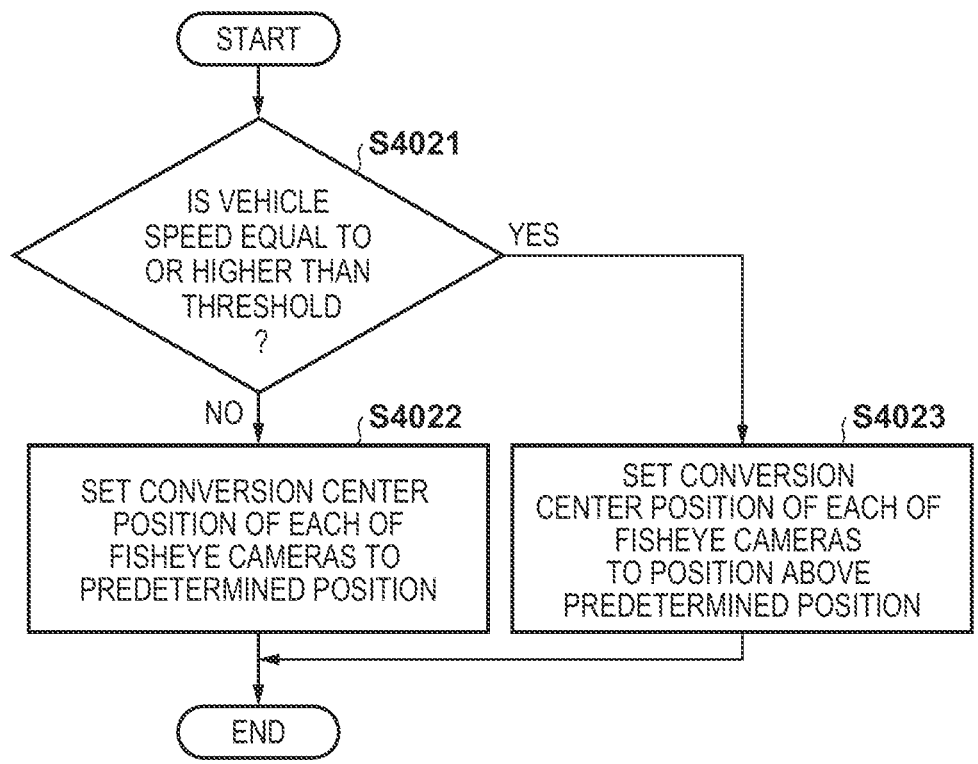
FIG. 5 is a flowchart illustrating a procedure of processing performed by the control device according to an embodiment of the present invention.

Next, a procedure of processing performed by the control device 2 according to the present embodiment will be described with reference to a flowchart of FIG. 5. The processing of FIG. 5 illustrates a detailed example of the processing of S402 of FIG. 4.

In S4021, the ECU 22 and the ECU 23 determine whether or not the speed of the vehicle 1 acquired in S401 is equal to or higher than a threshold (for example, 20 km/h). In a case where the speed of the vehicle 1 is equal to or greater than the threshold, the processing proceeds to S4023. On the other hand, in a case where the speed of the vehicle 1 is less than the threshold, the processing proceeds to S4022.

In S4022, the ECU 22 sets each of the conversion center position for converting the rightward fisheye image captured by the fisheye camera 42 into the planar image and the conversion center position for converting the leftward fisheye image captured by the fisheye camera 44 into the planar image to a predetermined position.

Figure 6:
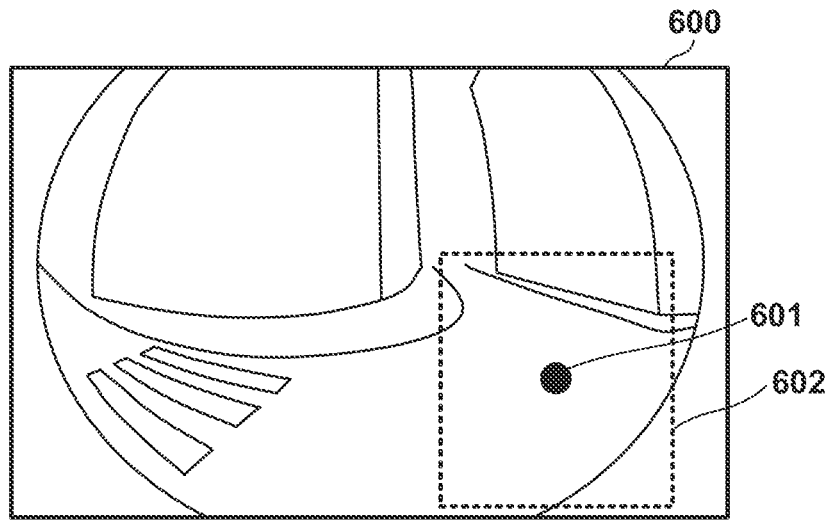
FIG. 6 is a diagram illustrating an example of a conversion center position (correction center point) of a predetermined position for a rightward fisheye image.

Here, an image 600 of FIG. 6 is an image of scenery on the rightward side of the vehicle 1 captured by the fisheye camera 42. The ECU 22 connected to the fisheye camera 42 sets one point in the image 600 as a correction center point 601. The ECU 22 generates an image (planar image) in which the distortion is reduce by cutting out a rectangular area 602 centered on the correction center point 601 from the image 600 and performing distortion correction processing on this area 602. Here, the correction center point 601 is a predetermined position in a case where the speed of the vehicle 1 is less than the threshold. The example of FIG. 6 is an example of the conversion center position for the rightward image, and the same also applies to the leftward image. The conversion center positions can have the same height (predetermined height from a lower end) in the image, but the conversion center positions may be different predetermined positions.

Moreover, in S4022, the ECU 23 sets each of the conversion center position for converting the forward fisheye image captured by the fisheye camera 41 into the planar image and the conversion center position for converting the rearward fisheye image captured by the fisheye camera 43 into the planar image to a predetermined position.

Figure 7A:
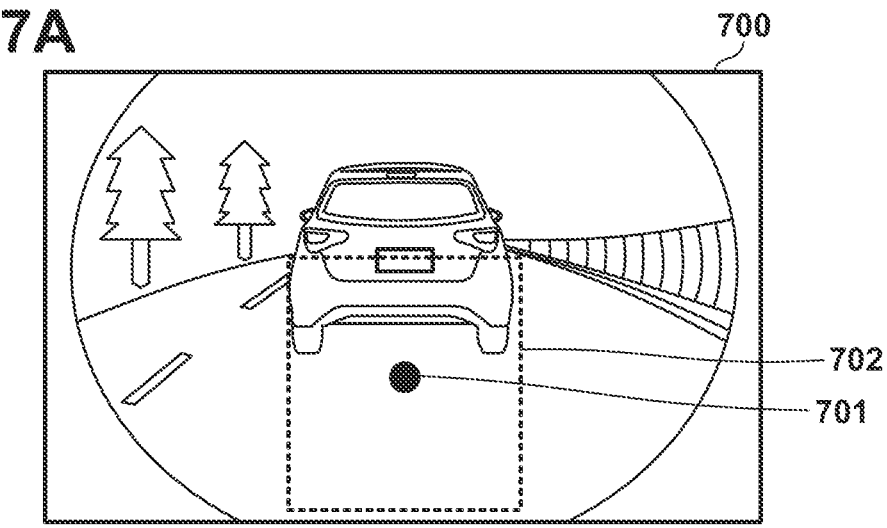
FIG. 7A is a diagram illustrating an example of a conversion center position (correction center point) of a predetermined position for a forward fisheye image.

Here, an image 700 of FIG. 7A is an image of scenery on the forward side of the vehicle 1 captured by the fisheye camera 41. A rear portion of a preceding vehicle is imaged. The ECU 23 connected to the fisheye camera 41 sets one point in the image 700 as a correction center point 701. The ECU 23 generates an image (planar image) in which the distortion is reduce by cutting out a rectangular area 702 centered on the correction center point 701 from the image 700 and performing distortion correction processing on this area 702. Here, the correction center point 701 is a predetermined position in a case where the speed of the vehicle 1 is less than the threshold. The example of FIG. 7A is an example of the conversion center position for the forward image, and the same also applies to the rearward image. The conversion center positions can have the same height (predetermined height from a lower end) in the image, but the conversion center positions may be different predetermined positions.

In S4023, the ECU 22 sets each of the conversion center position for converting the rightward fisheye image captured by the fisheye camera 42 into the planar image and the conversion center position for converting the leftward fisheye image captured by the fisheye camera 44 into the planar image to a position above a predetermined position in a case where the speed of the vehicle 1 is less than the threshold. For example, the conversion center position of the rightward fisheye image is set to a position of the correction center point 301 illustrated in FIG. 3 (that is, a position above the position of the correction center point 601). The example of FIG. 3 is an example of the conversion center position for the rightward image, and the same also applies to the leftward image. The conversion center positions can have the same height (predetermined height from a lower end) in the image, but the conversion center positions may be different positions.

Figure 7B:
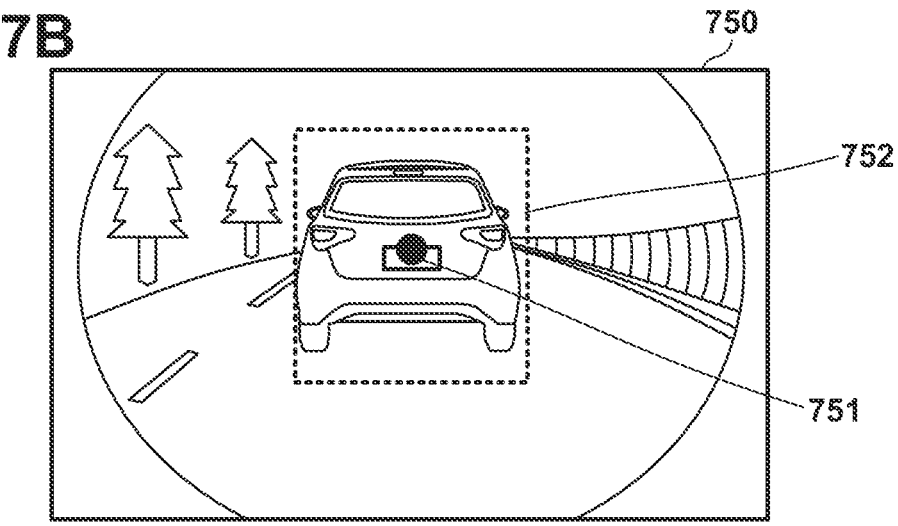
FIG. 7B is a diagram illustrating an example of a conversion center position (correction center point) set above a predetermined position for the forward fisheye image.

Moreover, in S4023, the ECU 23 sets each of the conversion center position for converting the forward fisheye image captured by the fisheye camera 41 into the planar image and the conversion center position for converting the rearward fisheye image captured by the fisheye camera 43 into the planar image to a position above a predetermined position in a case where the speed of the vehicle 1 is less than the threshold. For example, the conversion center position of the forward fisheye image is set to a position of a correction center point 751 of a rectangular area 752 in an image 750 illustrated in FIG. 7B (that is, the position above the position of the correction center point 701). The example of FIG. 7B is an example of the conversion center position for the forward image, and the same also applies to the rearward image. The conversion center positions can have the same height (predetermined height from a lower end) in the image, but the conversion center positions may be different predetermined positions. Accordingly, the series of processes in FIG. 5 is ended.

As described above, in the present embodiment, the conversion center position for converting the fisheye image of each of the fisheye cameras into the planar image is controlled based on the speed information of the vehicle. For example, whether to set the conversion center position to a predetermined position or to a position above a predetermined position is changed depending on whether the vehicle speed is equal to or greater than the threshold. According to this, the appropriate peripheral information can be accurately acquired according to the vehicle speed.

When the vehicle speed is low (for example, less than 20 km/h), the vehicle often travels on a narrow road such as a residential area, and the peripheral information in the vicinity of the vehicle can be accurately acquired by setting the conversion center position downward. On the other hand, when the vehicle speed is high, the vehicle often travels on a highway or the like, and by shifting the conversion center position upward, more distant peripheral information can be accurately acquired.

[Modifications]

Note that, in the embodiment described above, the example in which the conversion center position is switched according to whether or not the vehicle speed is equal to or higher than the threshold has been described. However, the conversion center position in a case where the vehicle speed is equal to or higher than the threshold may be continuously changed according to the vehicle speed.

For example, in a case where the vehicle speed is equal to or higher than the threshold, the conversion center position of the fisheye camera 42 that captures the rightward image may be set to a position above a predetermined position (position of the correction center point 601 illustrated in FIG. 6) as the speed of the vehicle 1 is higher. That is, in a case where the speed is less than the threshold, the conversion center position of the fisheye camera 42 is the position of the correction center point 601. In a case where the speed is low even when the speed is equal to or higher than the threshold, the conversion center position of the fisheye camera 42 becomes close to the position of the correction center point 601, and as the speed increases, the conversion center position may be set to be continuously changed (moved) upward from the position of the correction center point 601 toward the position of the correction center point 301 illustrated in FIG. 3 (or the position further above the correction center point 301). The same applies to the fisheye camera 44 that captures the leftward image. According to this, the appropriate peripheral information can be accurately acquired according to the vehicle speed.

Similarly, in a case where the vehicle speed is equal to or higher than the threshold, the conversion center position of the fisheye camera 41 that captures the forward image may be set to a position above a predetermined position (position of the correction center point 701 illustrated in FIG. 7A) as the speed of the vehicle 1 is higher. That is, in a case where the speed is less than the threshold, the conversion center position of the fisheye camera 41 is the position of the correction center point 701. In a case where the speed is low even when the speed is equal to or higher than the threshold, the conversion center position of the fisheye camera 41 becomes close to the position of the correction center point 701, and as the speed increases, the conversion center position may be set to be continuously changed (moved) upward from the position of the correction center point 701 toward the position of the correction center point 751 illustrated in FIG. 7B (or the position further above the correction center point 751). The same applies to the fisheye camera 43 that captures the rearward image. According to this, the appropriate peripheral information can be accurately acquired according to the vehicle speed.

Furthermore, in the embodiment described above, the example has been described in which the processing is switched according to a magnitude relationship between the vehicle speed and the threshold. However, regardless of the threshold of the vehicle speed, the conversion center position of each fisheye camera is set downward as the speed is lower, and the conversion center position of each fisheye camera may be set upward as the speed is higher.

Furthermore, an image conversion frequency of each of the fisheye cameras 42 and 44 disposed on the right and left sides of the vehicle 1 may be controlled to be lower than the image conversion frequency of each of the fisheye cameras 41 and 43 disposed on the front and rear side of the vehicle 1. For example, in a case where a vehicle is traveling on a single-lane road on one side or a lane change is not performed, a change in environment (peripheral information) in the front-and-rear direction often affects driving more than a change in environment (peripheral information) in the right-and-left direction. Therefore, by increasing the image conversion frequency (image acquisition frequency) in the front-and-rear direction rather than the right-and-left direction, more accurate information can be acquired in a timely manner, and by suppressing the image conversion frequency in the right-and-left direction, a processing load can be reduced.

Furthermore, in the embodiment described above, an example in which the ECU 22 and the ECU 23 perform processing separately has been described. However, these may be configured as a single ECU, and the single ECU may execute the processing of the embodiment described above or the modification.

Furthermore, a shape, a position, and a size of the rectangular area for the cutting out described in the embodiment are merely examples, and are not limited to the illustrated examples. A rectangular area having a larger size than the illustrated rectangular area may be used, or a rectangular area having a smaller size may be used. For example, in FIGS. 3 and 6, the rectangular area is set on the right side of the fisheye image, but the rectangular area may be set at the center as in FIGS. 7A and 7B, or may be set on the left side. Various modifications can be performed.

Other Embodiments

Furthermore, a program for implementing one or more functions described in the embodiments is supplied to a system or apparatus through a network or a storage medium, and one or more processors in a computer of the system or apparatus can read and execute the program. The present invention is also achievable by such an aspect.

The invention is not limited to the foregoing embodiments, and various variations/changes are possible within the spirit of the invention.

Summary of Embodiments

According to a first aspect, there is provided a control device (for example, 2) that controls imaging with fisheye cameras (41 to 44) disposed on front and rear portions and right and left side portions of a vehicle (for example, 1), the control device including:

an acquisition unit (for example, 22, and 23) configured to acquire information regarding a speed of the vehicle; and a control unit (for example, 22 and 23) configured to control a conversion center position for converting a fisheye image of each of the fisheye cameras into a planar image based on the speed of the vehicle.

According to this, appropriate peripheral information can be accurately acquired according to the vehicle speed.

In the control device (for example, 2) according to a second aspect, the control unit sets the conversion center position of each of fisheye cameras downward as the speed is lower (for example, 601 and 701).

According to this, when the vehicle speed is low, peripheral information in the vicinity of the vehicle can be accurately acquired. Therefore, it is possible to accurately acquire the peripheral information in the vicinity of the vehicle at the time of a low speed when the vehicle passes through a narrow road, parking assistance is performed, or automatic parking is performed.

In the control device (for example, 2) according to a third aspect, the control unit sets the conversion center position of each of fisheye cameras upward as the speed is higher (for example, 301 and 751).

According to this, when the vehicle speed is high, the peripheral information regarding a place distant from the vehicle can be accurately acquired. Therefore, it is possible to accurately acquire the peripheral information regarding a place distant from a self-vehicle at the time of a high speed when the vehicle travels on a highway or travels on an expressway.

In the control device (for example, 2) according to a fourth aspect, the control unit sets the conversion center position of each of the fisheye cameras to a predetermined position in a case where the speed is less than a threshold (for example, 20 km/h) (for example, 601 and 701), and sets the conversion center position of each of the fisheye cameras to a position above the predetermined position as the speed is higher in a case where the speed is equal to or higher than the threshold (for example, 301 and 751).

As described above, the predetermined position on the lower side is set as the conversion center position when the vehicle speed is low, and the conversion center position is gradually moved upward when the vehicle speed reaches a certain level or higher. Therefore, it is possible to accurately acquire the peripheral information in the vicinity of the vehicle at a predetermined conversion center position at the time of a low speed when the vehicle passes through a narrow road, parking assistance is performed, or automatic parking is performed, and it is possible to accurately acquire the peripheral information regarding a place distant from the self-vehicle at the time of a high speed when the vehicle travels on a highway or travels on an expressway.

In the control device (for example, 2) according to a fifth aspect, in a case where the speed is equal to or higher than the threshold, the control unit sets the conversion center position of each of the fisheye cameras to a position above the predetermined position as the speed is higher, and sets the conversion center position of each of the fisheye cameras disposed on the front and rear portions of the vehicle to a position above the conversion center position of each of the fisheye cameras disposed on the right and left side portions of the vehicle.

At the time of a high speed, a change in peripheral information in the front-and-rear direction has a greater influence on driving than in the right-and-left direction. Therefore, by setting the conversion center position of the fisheye camera in the front-and-rear direction to be above the conversion center position of the fisheye camera in the right-and-left direction, it is possible to acquire more appropriate peripheral information according to the situation.

In the control device (for example, 2) according to a sixth aspect, the control unit sets the conversion center position of each of the fisheye cameras to a predetermined position in a case where the speed is less than a threshold, and sets the conversion center position of each of the fisheye cameras to a position above the predetermined position in a case where the speed is equal to or higher than the threshold.

By switching the conversion center position according to the magnitude relationship between the vehicle speed and the threshold, the peripheral information in the vicinity of the vehicle can be accurately acquired at the time of a low speed, and the peripheral information distant from the vehicle can be accurately acquired at the time of a high speed.

In the control device (for example, 2) according to a seventh aspect, the control unit controls an image conversion frequency of each of the fisheye cameras disposed on the right and left side portions of the vehicle to be lower than the image conversion frequency of each of the fisheye cameras disposed on the front and rear portions of the vehicle.

In a case where a vehicle is traveling on a single-lane road on one side or a lane change is not performed, a change in environment (peripheral information) in the front-and-rear direction often affects driving more than a change in environment (peripheral information) in the right-and-left direction. By increasing the image conversion frequency (image acquisition frequency) in the front-and-rear direction rather than the right-and-left direction, more accurate information can be acquired in a timely manner, and by suppressing the image conversion frequency in the right-and-left direction, a processing load can be reduced.

According to an eighth aspect, there is provided an operation method for a control device (for example, 2) that controls imaging with fisheye cameras disposed on front and rear portions and right and left side portions of a vehicle (for example, 1), the operation method including:

acquiring information regarding a speed of the vehicle (for example, S401); and controlling a conversion center position for converting a fisheye image of each of the fisheye cameras into a planar image based on the speed of the vehicle (for example, S402).

According to this, appropriate peripheral information can be accurately acquired according to the vehicle speed.

According to a ninth aspect, there is a non-transitory computer-readable storage medium that stores a program causing a computer to function as the control device according to any one of the first to seventh aspects.

According to this, the operation of the vehicle control device can be realized by the computer.

According to the present invention, appropriate peripheral information can be accurately acquired according to the vehicle speed.

What is claimed is:

1. A control device that controls imaging with fisheye cameras disposed on front and rear portions and right and left side portions of a vehicle, the control device comprising:
   an acquisition unit configured to acquire information regarding a speed of the vehicle; and
   a control unit configured to control a conversion center position for converting a fisheye image of each of the fisheye cameras into a planar image based on the speed of the vehicle.

2. The control device according to claim 1, wherein the control unit sets the conversion center position of each of fisheye cameras downward as the speed is lower.

3. The control device according to claim 1, wherein the control unit sets the conversion center position of each of fisheye cameras upward as the speed is higher.

4. The control device according to claim 1, wherein the control unit sets the conversion center position of each of the fisheye cameras to a predetermined position in a case where the speed is less than a threshold, and sets the conversion center position of each of the fisheye cameras to a position above the predetermined position as the speed is higher in a case where the speed is equal to or higher than the threshold.

5. The control device according to claim 4, wherein in a case where the speed is equal to or higher than the threshold, the control unit sets the conversion center position of each of the fisheye cameras to a position above the predetermined position as the speed is higher, and sets the conversion center position of each of the fisheye cameras disposed on the front and rear portions of the vehicle to a position above the conversion center position of each of the fisheye cameras disposed on the right and left side portions of the vehicle.

6. The control device according to claim 1, wherein the control unit sets the conversion center position of each of the fisheye cameras to a predetermined position in a case where the speed is less than a threshold, and sets the conversion center position of each of the fisheye cameras to a position above the predetermined position in a case where the speed is equal to or higher than the threshold.

7. The control device according to claim 1, wherein the control unit controls an image conversion frequency of each of the fisheye cameras disposed on the right and left side portions of the vehicle to be lower than the image conversion frequency of each of the fisheye cameras disposed on the front and rear portions of the vehicle.

8. An operation method for a control device that controls imaging with fisheye cameras disposed on front and rear portions and right and left side portions of a vehicle, the operation method comprising:
   acquiring information regarding a speed of the vehicle; and
   controlling a conversion center position for converting a fisheye image of each of the fisheye cameras into a planar image based on the speed of the vehicle.

9. A non-transitory computer-readable storage medium that stores a program causing a computer to execute an operation method for a control device that controls imaging with fisheye cameras disposed on front and rear portions and right and left side portions of a vehicle, the operation method comprising:
   acquiring information regarding a speed of the vehicle; and
   controlling a conversion center position for converting a fisheye image of each of the fisheye cameras into a planar image based on the speed of the vehicle.

* * * * *